United States Patent [19]

McCoy et al.

[11] Patent Number: 5,036,484
[45] Date of Patent: Jul. 30, 1991

[54] PERSONAL COMPUTER/HOST EMULATION SYSTEM FOR HANDLING HOST DATA WITH PERSONAL COMPUTER APPLICATION PROGRAMS AT PERSONAL COMPUTERS

[75] Inventors: Glenn C. McCoy, Nichols, N.Y.; Eric N. Yiskis, Lompoc, Calif.

[73] Assignee: International Business Machines Corporation, Amonk, N.Y.

[21] Appl. No.: 275,341

[22] Filed: Nov. 23, 1988

[51] Int. Cl.⁵ .................. G06F 15/16; G06F 15/18
[52] U.S. Cl. .................. 364/900; 364/927.81; 364/927.82; 364/927.98; 364/928; 364/928.3; 364/933.9; 364/943.44; 364/948.3; 364/948.9; 364/962.1; 364/975.1; 364/976.1; 364/977
[58] Field of Search ... 364/200 MS File, 900 MS File

[56] References Cited

U.S. PATENT DOCUMENTS

| | | | |
|---|---|---|---|
| 3,955,180 | 5/1976 | Hirtle | 364/200 |
| 4,291,372 | 9/1981 | Forbes et al. | 364/200 |
| 4,482,955 | 11/1984 | Amano et al. | 364/200 |
| 4,513,373 | 4/1985 | Sheets | 364/200 |
| 4,611,277 | 9/1986 | Kemppainen et al. | 364/200 |
| 4,791,561 | 12/1988 | Huber | 364/200 |
| 4,896,290 | 1/1990 | Rhodes et al. | 364/900 |
| 4,896,291 | 1/1990 | Gest et al. | 364/900 |
| 4,899,136 | 2/1990 | Beard et al. | 364/900 |
| 4,903,218 | 2/1990 | Longo et al. | 364/900 |

*Primary Examiner*—Joseph A. Popek
*Assistant Examiner*—George C. Pappas
*Attorney, Agent, or Firm*—Hugh D. Jaeger

[57] ABSTRACT

A system for emulating the operation of a terminal connected to a host computing system while retaining the ability to utilize personal computer application programs resident in the personal computer by utilizing a personal computer/host terminal emulation program which conducts an analysis of host data and keystrokes to identify personal computer commands and calls the appropriate resident application program in response to such commands.

16 Claims, 8 Drawing Sheets

PERSONAL COMPUTER/HOST EMULATION SYSTEM FOR HANDLING HOST DATA WITH PERSONAL COMPUTER APPLICATION PROGRAMS AT PERSONAL COMPUTERS

BACKGROUND OF THE INVENTION

Field of the Invention

This invention is directed to a system for the connection of a personal computer, operating as a terminal emulator, to a host system in a manner which allows data existent in the host system to be extracted from the host, manipulated by a personal computer using a conventional personal computer program, and the modified data returned to the host system for storage.

In particular, the invention pertains to a personal computer terminal emulation system which accommodates a first, emulation, operating mode in the host in conventional fashion and a second, personal computer, operating mode in which data extracted from the host system while operating in the emulation mode may be processed with conventional personal computer application programs.

BACKGROUND ART

Personal computers have found widespread application as terminals connected to a substantially larger host system. In this application, the personal computer operates under the control of an "emulator" program, resident in the personal computer, which causes the personal computer to function in the same fashion, i.e., emulate, a conventional terminal. When operating in the emulation mode of the prior art systems, the personal computer is incapable of performing functions other than those of the terminal which is being emulated. Thus, the diverse and powerful functions which are capable of being performed by the personal computer, operating as such, are not available in the emulation mode.

The wide variety of programs available for use on personal computers provides a potential user with an assortment of tools which accommodate almost any computer task. Some of the more common applications, such as spread sheets and word processing, have many different programs, each of which has certain advantages and disadvantages. This proliferation has led to a lack of uniformity in the way in which data is formatted, the use of different control characters, and the presence of functions or operations which are unique to each program.

In some areas, notably word processing, programs have been devised to convert documents written with one word processing program to the format of another word processing program. This allows a document prepared with a first program to be altered and printed with a second, different, program. An example of such an approach is described in U.S. Pat. No. 4,503,516, assigned to assignee of this invention. The system of that patent describes an interconnection arrangement which allows conversion of documents between DisplayWriter (DW) format and PROFS (Professional Office System) format. The DisplayWriter format is used by a stand alone device, such as the system of the same name or a personal computer, and the Professional Office System is used as a host system such as an IBM System/370.

The systems of the prior art have generally operated in a batch fashion to convert the entire document from a first format to a second format. This has the disadvantage that the entire document must be so converted even if only a minor change in the document is to be made. The inefficiency of this approach is even more obvious in the case where it is only desired to visually present the document to the operator. Even in the case where it is desired only to read the document, the prior art approach requires that the entire document must be first converted to the format of the personal computer and then reconverted back to the original format when stored in the host system.

Additionally, it would be desirable to utilize the abundance of specialized functions provided by programs available for personal computers to process data from a host system which may have been produced with a program unrelated to the program in the personal computer. The previous example involved two different word processing programs. Such programs are related to the same basic problem and the conversion between them could even be classified as straightforward. However, in the case where a numerical table exists in the word processing document, it is often desirable to apply numeric programs to this portion of the document. It would be desirable to be able to perform calculations on numeric data and insert the result of the calculation into a host document without the need to exit from the host emulation program, call up the application program, fetch the file from the host, perform the calculation, exit from the application program and reenter the host emulation program. While programs for this purpose do exist, they are specialized for particular programs, and therefore, lack the ability to accommodate data from programs not contemplated by the designer.

The prior art approaches to the problem have generally required conversion of all the data from the first to the second format prior to use of the second program; and were available, only for interchanges between a limited set of programs. The requirement for conversion prior to use of the second program imposes a substantial burden in terms of conversion processing, and may even require conversion which is unnecessary in the sense that portions of the converted data may never be used or modified. Despite the fact that processors are operating at ever increasing speeds and efficiencies, there is nevertheless a finite delay between the time the operator requests a document for conversion processing and the time that document is actually available for use or modification by the operator.

An example of a prior art terminal emulation program is the IBM PC 3270 Emulation Program available from International Business Machines Corp., the assignee of this invention. Turbo Pascal 4.0, IBM Version for IBM PS/2 (TM—IBM Corp.), PC XT (TM—IBM Corp.) and AT (TM—IBM Corp.), a high level language selected for expression of the preferred embodiment of this invention is available from Borland International, 4585 Scotts Valley Drive, Scotts Valley, Calif. 95066. C Compiler, an alternative high level language for expression of the program of this invention, is available from the International Business Machines Corp., P.O. Box 1328W, Boca Raton, Fla. 33429-1328. Macro Assembler Version 2.0, also available from the International Business Machines Corp., is also helpful in implementing the invention. Terminate and stay, resident programs which are used in the implementation of this invention, are described in "The History and Technology of TSR; Terminate and Stay Resident Software", pp 39-49, an article by Steve Gibson in *RAM LORD USER'S MANUAL*, published by Waterworks Software, Inc., 913 Electric Avenue, Seal Beach, Calif. 90740.

SUMMARY OF THE INVENTION

It is therefore an object of this invention to provide a system in which a document or data file, resident in a host system in a first format according to a first program, can be visually displayed on a personal computer or like device and modified by the use of a second program which may have a different data format than the first program.

It is another object of this invention to provide a system in which the modification of data recorded in a format according to a first program may be accomplished with a second program, having a format differing from the first program, without the need for conversion of the entire data file.

It is a further object of this invention to provide a system which allows modification of data, stored in a host system and recorded in a format according to a first program, by a personal computing system utilizing a second program having a different format by utilizing the display buffer of the personal computer as a facility shared by the personal computer and the host system.

These and other objects of this invention are accomplished by a personal computer terminal emulation program resident in a personal computer, connected for use with a host system containing data stored according to a first format, which allows the personal computer operating in an emulation mode to directly utilize an application program, requiring data according to a second form, to modify, record and otherwise process data which is stored in the buffer associated with the display of the personal computer, which returns the processed data back to the host computer when execution of the operation is completed.

Appendix A is a program listing of the preferred embodiment written in Turbo Pascal for execution on an IBM Personal Computer connected to an IBM System/370.

DESCRIPTION OF THE PREFERRED EMBODIMENTS

Figure 1:
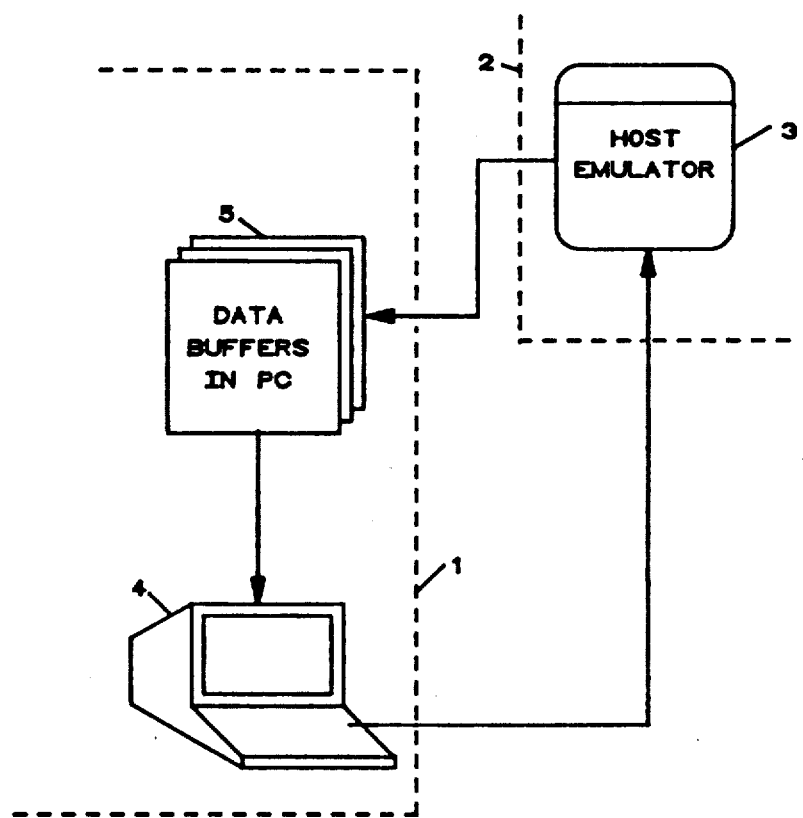
FIG. 1 an illustration of a prior art technique for the operation of a terminal in a host environment.

The system shown in FIG. 1 is representative of the prior art approach to the problem. Where the personal computer 1 is to be used as a terminal, the conventional approach would be to have the host system 2, a large or central data processing system, provide the support for the terminal by means of an emulator 3, which is resident in the host mainframe. This required all the keystrokes at the personal computer to be passed to the host system 2 for processing. The display screen 4 at the personal computer 1 was generated at the host system 2 and passed to the data buffers 5 in the personal computer 1. Such a system is limited to the emulators contained in the host system and does not utilize either the computing power of the personal computer 1 or the multitude of application programs available for such computers.

Figure 2:
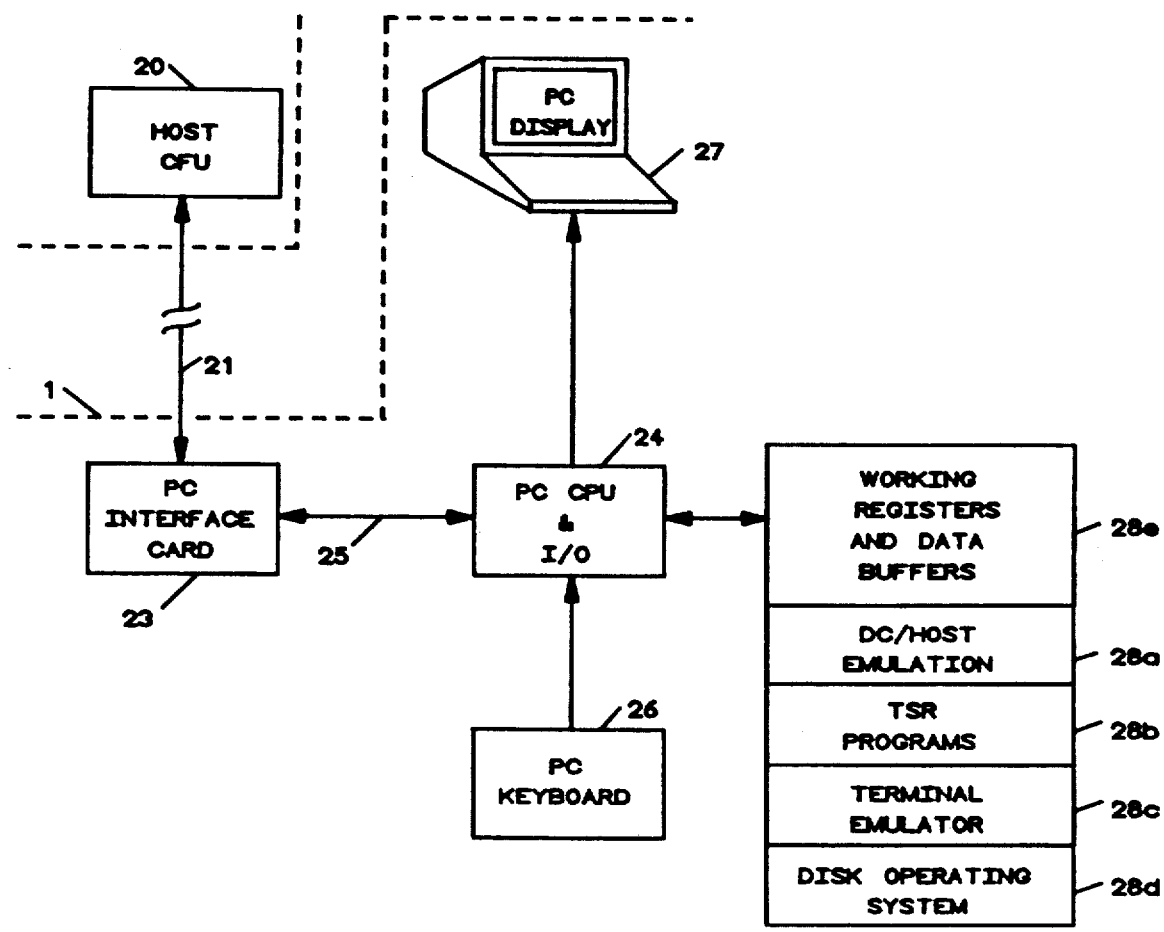
FIG. 2 is an illustration of the system hardware arrangement which is used to practice the invention.

As shown in FIG. 2 the hardware arrangement used to practice the invention includes the CPU 20 within the host system 2, which is connected via a conventional communications interface 21 to the personal computer interface card 23 which resides within the personal computer 1. The interface card 23 is connected to the personal computer CPU 24 over bus 25. A conventional keyboard 26 and display 27 are connected to CPU 24 in conventional fashion. Random access memory (RAM) 28 has a portion 28a dedicated to storage of the software program which performs the functions of the invention. Additional portions 28b, 28c and 28d are devoted to the storage of PC application programs which are of the class known as terminate and stay resident (TSR) programs, the terminal emulator program, and the disk operating system, respectively. Terminate and stay resident programs are described in "The History and Technology of TSR; Terminate and Stay Resident Software", pp 39-49, *Ram Lord User's Manual*, published by Waterworks Software, Inc., 913 Electric Avenue, Seal Beach, Calif. 90740. Very simply, such programs are designed to run on a personal computer under DOS and are continually resident in random access memory and are called into action by a specific pointer, in this case, developed by the actuation of a "hot" key or keys. Random access memory 28 also contains a portion 28e devoted to various working register and data buffers used by the programs.

Figure 3:
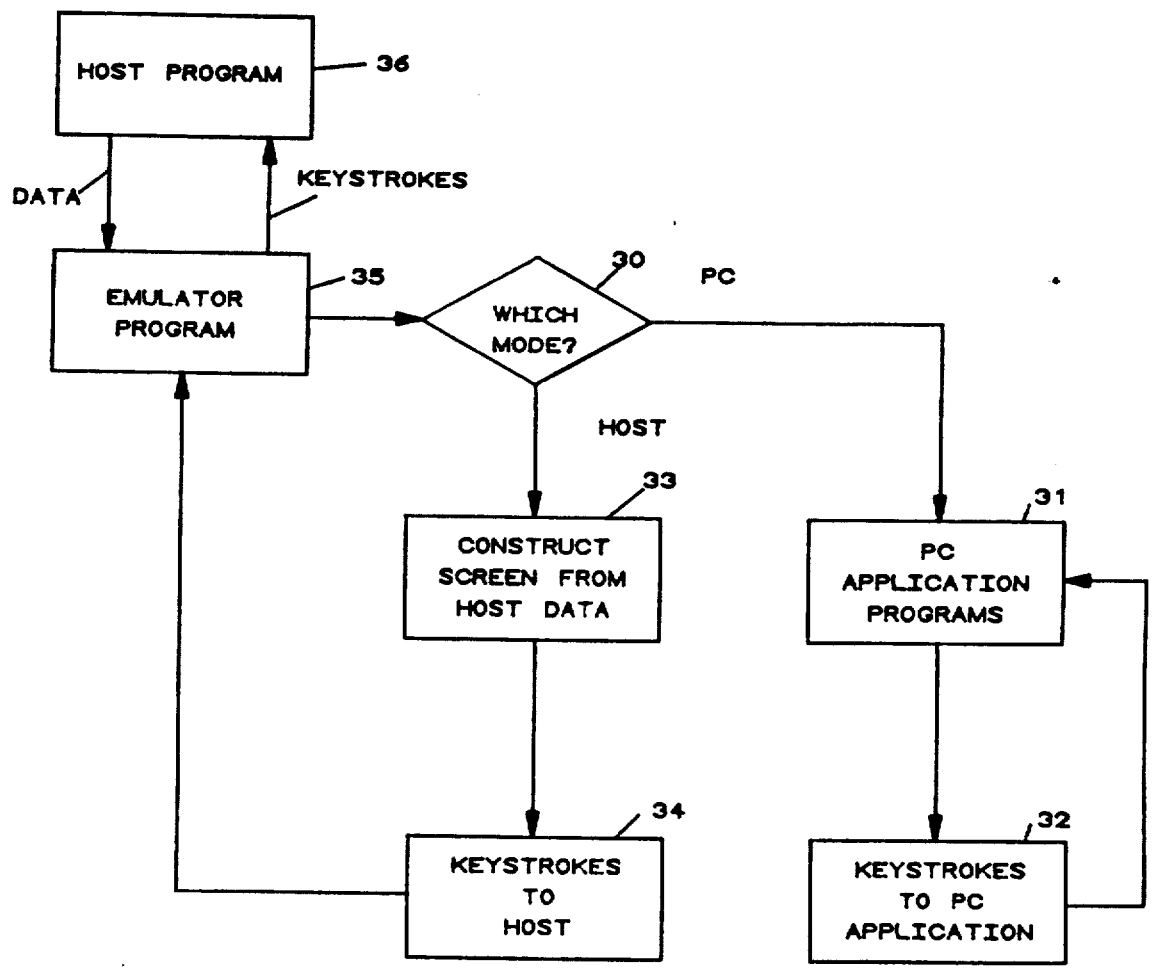
FIG. 3 is a programming flow chart showing the fashion in which the system toggles between the PC/host emulation program and the PC mode.

FIG. 3 illustrates how the system toggles back and forth between the host terminal emulation mode and the PC mode. The user may cause the system to switch from one mode to the other by depressing the selected key or a selected combination of keys which then develops the appropriate pointer. The PC/host emulation program monitors the keyboard to detect the actuation of the selected key or combination of keys representing PC application program functions as shown in block 30. When the PC mode is selected by actuation of a key representing a PC application program function, the program branches to block 31, causing the selection of the appropriate PC application program and the desired function. The system remains in the PC application mode until the appropriate key (or keys) is depressed, which actuates block 30 to cause the system to switch back to the host emulation mode.

In the terminal emulation mode, as will later be described in more detail, the screen is constructed from data obtained from the host in accordance with block 33. The keystrokes in this mode are detected by block 34 and sent to the host via the emulator program as shown in block 35. The host operates to interpret the keystrokes in conventional fashion in accordance with the host program as shown in block 36. Data resident in the host may be sent to the emulator program as shown.

Figure 3A:
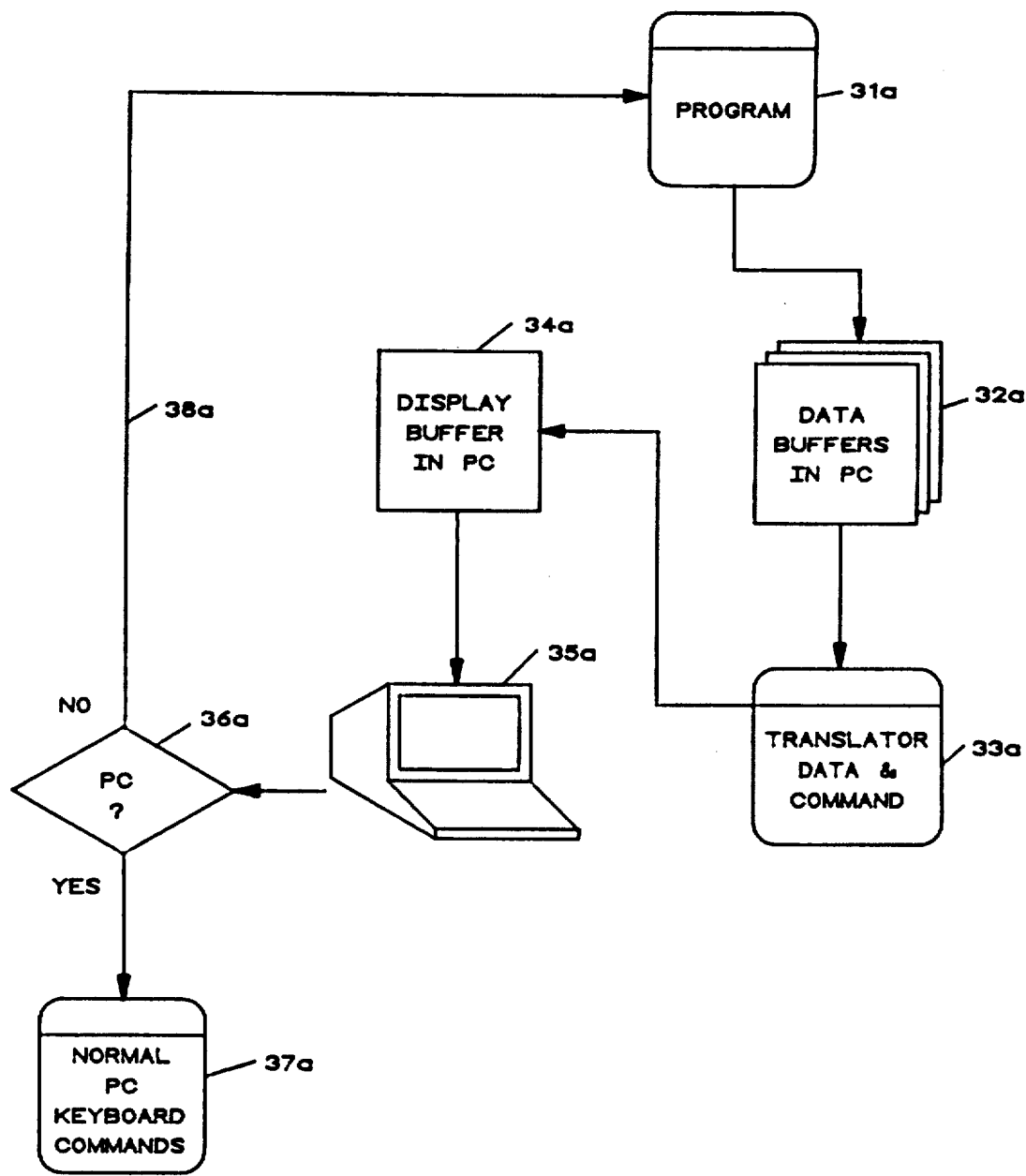
FIG. 3a is an illustration of the basic functional aspects of the system used to practice the invention.

FIG. 3a provides an overview of the various functional aspects of the invention. When operating under control of the PC/host terminal emulation program., two fundamental functions are performed on a recurring basis. The first function is to monitor host data to sense a host data update. The data supplied to the personal computer at the outset of the operation may be independently updated by the host system during a PC session. That is, the data previously supplied to the personal computer by the host system may become obsolete during the course of the PC session. For this reason, the PC/host emulation program continuously monitors the host data to determine if any changes have been made since the last update.

The second function is to monitor the personal computer keyboard for activity. Depression of a key on the keyboard can signal the entry of new data on the screen, or it can be a command such as would require host activity or the calling of a terminate and stay resident application program resident in the personal computer.

At the outset, the host data, which will most commonly represent a screen on the host display, is translated into PC format by data translation portion 31a emulation program. The host display data, now in PC format, is loaded into a data buffer 32a in the PC. Since the PC display commonly responds to codes which differ from the display codes of the host, a further translation into PC display codes by the display translation portion 33a of the emulation program is performed. The resulting data, in the PC display format, is loaded into the PC display buffer 34a and presented on the PC keyboard/display 35a.

Keystrokes on the keyboard/display 35a are examined by the keystroke interpretation portion 36a of the emulation program to determine whether a PC or a host function is required. Program block 36a is responsive to the selected mode. In the PC mode, the keystrokes are handled by block 37a as normal keyboard commands or data. In the emulation mode, the keystrokes representing the host keys are passed to the host processor via the host emulator 31a.

Figure 4:
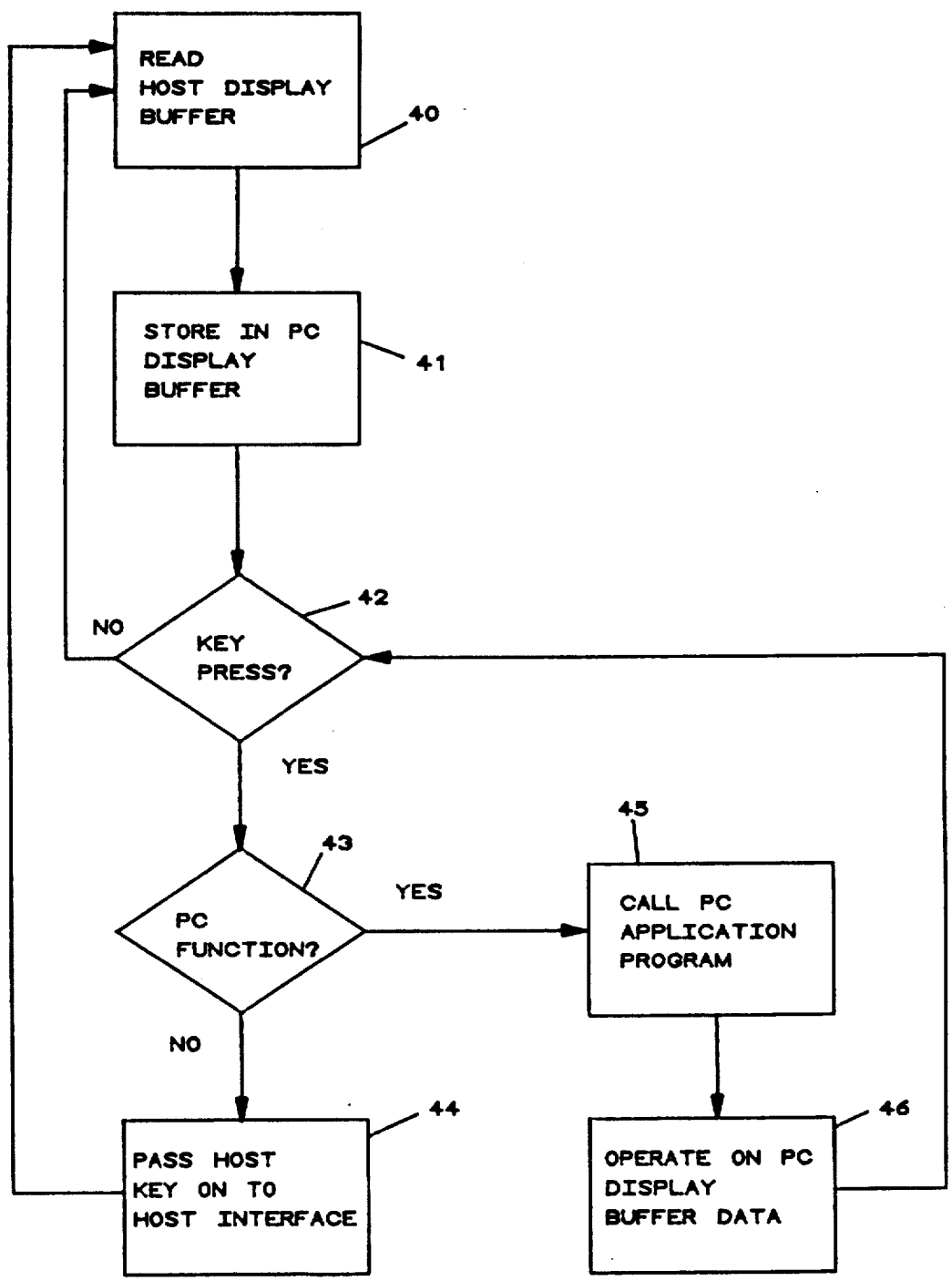
FIG. 4 is a programming flow chart showing an overview of the operation of the program.

The data flow chart of FIG. 4 represents an overview of the operation of the PC/host terminal emulation program. Beginning with block 40, the program reads the host display buffer in search of new information. The content of the host display buffer is first translated into PC format and further translated into the appropriate PC display codes for storage in the PC display buffer at block 41 to display the host screen contents on the PC display screen.

The PC/host terminal emulation program then checks to see if there has been a PC application program key depressed as shown in block 42. A PC application program key is one which has been specifically designated as a "hot" key which operates to call in a particular PC terminate and stay resident application program. In contrast to prior art terminal emulation programs which disabled the "hot" keys, the program of this invention allows use of the hot keys while in the terminal emulation mode. That is, the operator is permitted to call PC application programs and their functions by the depression of the appropriate hot key. If a hot key has not been depressed, the program loops back to block 40 in search of new host display information. If there has been a PC key depressed, the program branches to the test for a PC function in block 43. If the depressed key is not a PC function, it is necessarily a host key function, and block 44 causes the program to branch back to block 40, passing the host key information to the host for display and/or command action. If the depressed key represents a PC function, block 43 passes the program to block 45, which calls the appropriate PC application program. The specified PC application program then operates on the data in the PC display buffer as shown in block 46 and branches back to block 42 to check for actuation of a PC key.

Figure 5:
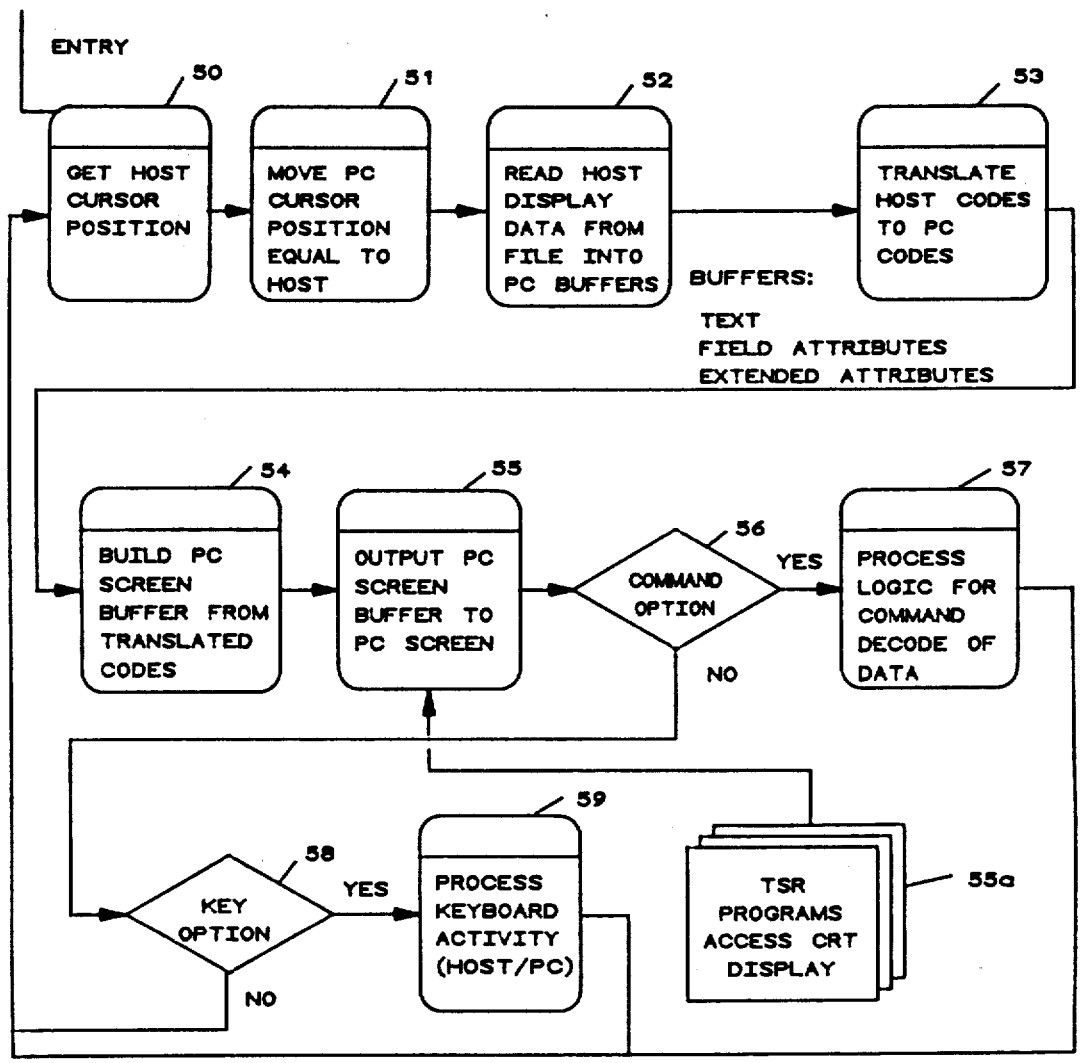
FIG. 5 is a programming flow chart including the portion of the program which converts data stored in the host computer into data which is displayed on the personal computer.

The reading of the host display buffer and subsequent display on the PC screen is set forth in detail in the data flow chart of FIG. 5. The entry into initial block 50 is made from appropriate branches such as shown broadly in FIG. 3 and in more detail in FIG. 4. The portion of the PC/host terminal emulation program represented in block 50 operates to obtain the row and column information representing the position of the cursor on the host display screen. This information is obtained by using the host interrupt and passed to the PC. Utilizing the PC interrupt facility, the PC/host terminal emulation program moves the PC cursor to the corresponding spot on the PC screen as shown in block 51. The PC/host terminal emulation program then causes the host text data buffer to be read and the information passed to the PC. In similar fashion, the PC/host terminal emulation program causes the host display (field) attributes and extended attributes to be read and passed to the PC.

Having obtained all the information on the host display and passed this information to buffers in the PC, as shown in block 52, the host codes for the text data, field attributes and extended attributes are converted to PC compatible codes, as shown at block 52. Despite the fact that the translation of block 53 puts the data into PC format, it is necessary to perform the operation of block 54 which converts the data into PC display codes corresponding to the display codes used by the host processor. The PC display codes are stored in the PC display buffer, shown in block 55, from which they drive the display, duplicating the display of the host.

Where the PC is operating under the direct control of a TSR program, the CRT display is generated by data from the TSR program as shown in block 55a.

At block 56, the PC/host terminal emulation program tests to see if a command exists in the data displayed on the PC screen. Since all the display data is tested, the text data, field attributes and extended attributes may all be used as the basis for commands. The commands are tested at block 57 and may be used by the PC/host terminal emulation program to cause actions within either or both the PC or host environments. For example, a command can cause a PC application program to be executed by "shelling"/returning to the PC DOS environment to execute a program. At the normal exit from the PC application program the return, via the shell, may return the user to the host environment in a fashion which remains completely transparent to the user. As previously described, certain keys may be used to call Terminate and Stay Resident (TSR) programs within the PC. These keys will override all other keys and can be used to call PC application programs such as spell checking and synonym selection. The PC/host terminal emulation program develops the appropriate command parameters which are then passed to a batch file in the PC DOS environment. The PC application is executed with normal PC functions until the user, or application program itself, exits from the application in the normal fashion.

When the refresh of the PC display is complete and in the event that the PC screen data does not contain command information, the test performed at block 56 branches to the test for keyboard activity at block 58. If there has been keyboard activity, the key strokes are examined. PC keystrokes are processed in normal PC fashion by block 59, and non-PC keystrokes are immediately passed to the host.

Figure 6:
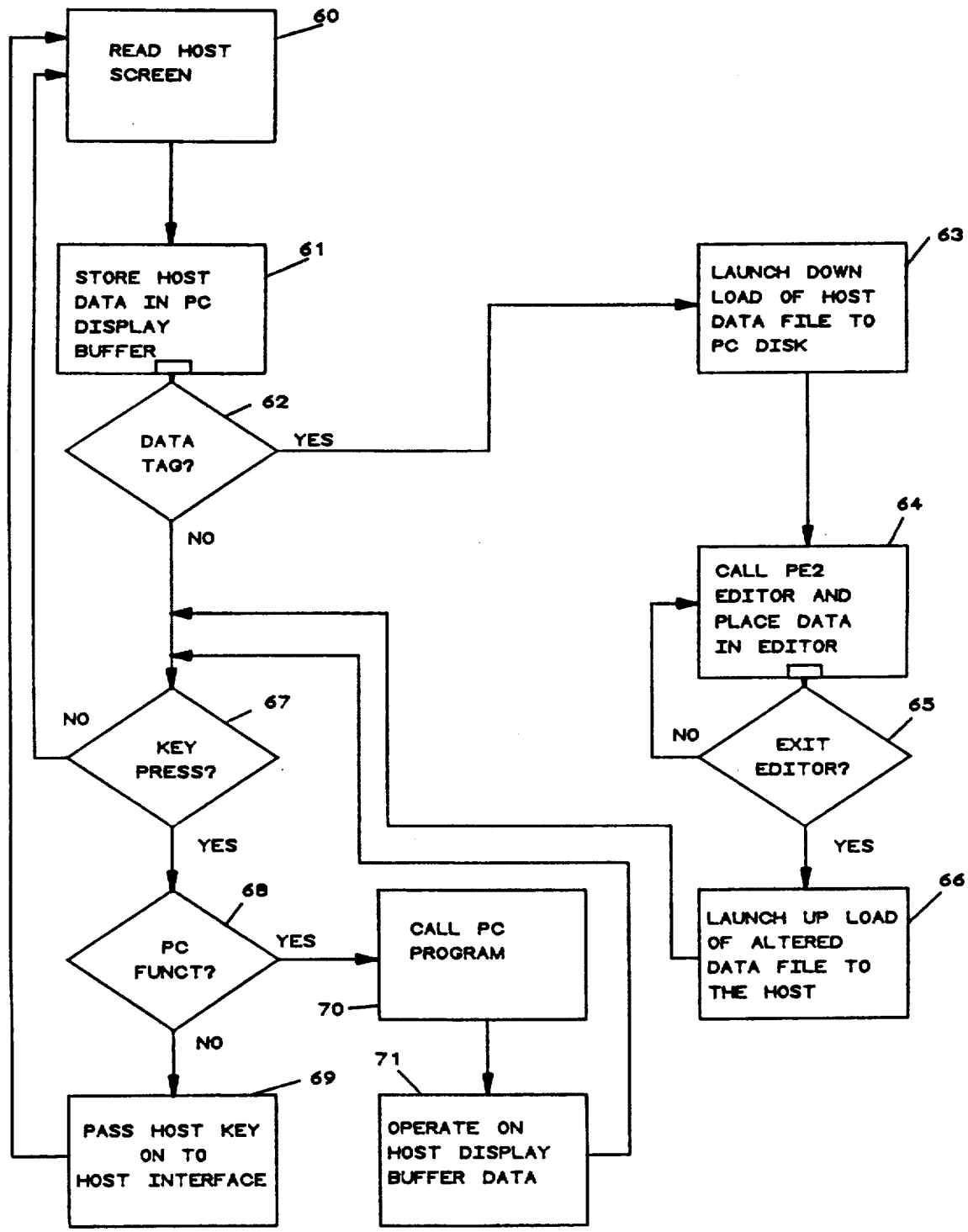
FIG. 6 is a programming flow chart including the portion of the program utilizing a personal computer program to process data which is stored in the host computer.

It is possible to automatically select a PC application program in response to the data downloaded to the PC from the host computer. This phase of the invention is shown in FIG. 6. In the example, the host data file is an XEDIT file created and used by the host program called XEDIT. While the XEDIT program is an acceptable approach to the editing problem, the PC application program PE2 (Personal Editor 2) would likely be more familiar to the PC user and presents advantages over XEDIT for this reason.

The PC/host terminal emulation program allows the user to specify certain parameters when the program is used. For example, it is possible to specify any personal computer application program in response to designators in the host file to be operated on. In the selected example, the host file is an XEDIT file. That is, the host data file to be operated on at the PC was created on the host with the use of the host program called XEDIT. There is a field in the data file, which may be a portion of the file name, which designates it as an XEDIT file. The PC/host terminal emulation program allows a user to designate which PC application program is to be called for each of the host application programs. In the example selected, the user has designated the PE2 application program to be called when a host data file of the XEDIT type is to be used.

Beginning with the reading of the host screen at block 60, the screen data is translated as previously described and stored in the PC screen buffer by the portion of the PC/host terminal emulation program represented by block 61. At this point the PC/host terminal emulation program tests the screen data for the existence of a data tag as shown in block 62. In the example selected, the data file on the host screen was generated using XEDIT, an editing program in common use on large systems. The user profile generated on the PC specified that when an XEDIT data file was retrieved from the host and loaded into the PC for further processing, the file was to be processed with the PE2 application program instead of XEDIT. When the test at block 62 detects that the displayed portion of the file is a data file, generated with XEDIT file, it causes the download of the entire data file as shown in block 63 and automatically calls the PC application program PE2 in block 64.

Control of the PC then rests with PE2, allowing the user to edit the data file with this application program. The PC/host terminal emulation program simply waits until the user exits from PE2 in the normal fashion. This exit is detected at block 65. In the absence of the exit command, the PC/host terminal emulation program continues the loop between block 64 and block 65, holding the PC in the PE2 application program.

On detection of the normal exit command from the PC application program PE2 by the portion of the program represented by block 65, the PC/host terminal emulation program branches to block 66. This causes the altered data file to be uploaded back to the host. When this operation is completed, the program proceeds to block 67, which tests to see if a key has been depressed. If there has been no key depression, the program reenters the main loop beginning at block 60, to see if new data is available at the host screen.

In the case where a key has been depressed, the branch from block 67 proceeds to block 68 which evaluates the key depressed to see if it calls a PC function, that is, to determine if the depressed key specifies an operation which requires the use of a PC application program. If the depressed key is not one which requires a PC application program, the keystroke is one which is to be passed to the host for action. The PC/host terminal emulation program branches to block 69, which passes the keystroke to the host and reenters the program at block 60.

In the case where the depressed key requires the intervention of a PC application program, say, for example, a spelling check, the portion of the program represented by block 70 operates to call the specified PC program, which then may be used in conventional fashion to operate on the display data as shown in block 71. When the PC application program is exited, the program branches back to block 67, to check for further key depressions.

It will be appreciated that the loop which includes blocks 67, 68, 70 and 71 is operative to call such popular PC application programs as "Lightning", a spelling checker program marketed by Borland International. The user would specify that the "Lightning" program is to be active when in the PC mode of operation; that is, when in the loop defined by blocks 67, 68, 70 and 71. In this mode, the "Lightning" program checks the spelling of each word as it is typed and emits a beep when the word is spelled incorrectly. By depressing a "hot" key, that is, one which operates to call a specific PC application program, the user may invoke the portion of "Lightning" which allows the user to look up the most probable correct spelling of the misspelled word. Return to the normal mode of operation is made by depressing the appropriate "hot" key or by the application program which may operate to terminate itself when the requested function has been completed.

Figures 7, 8:
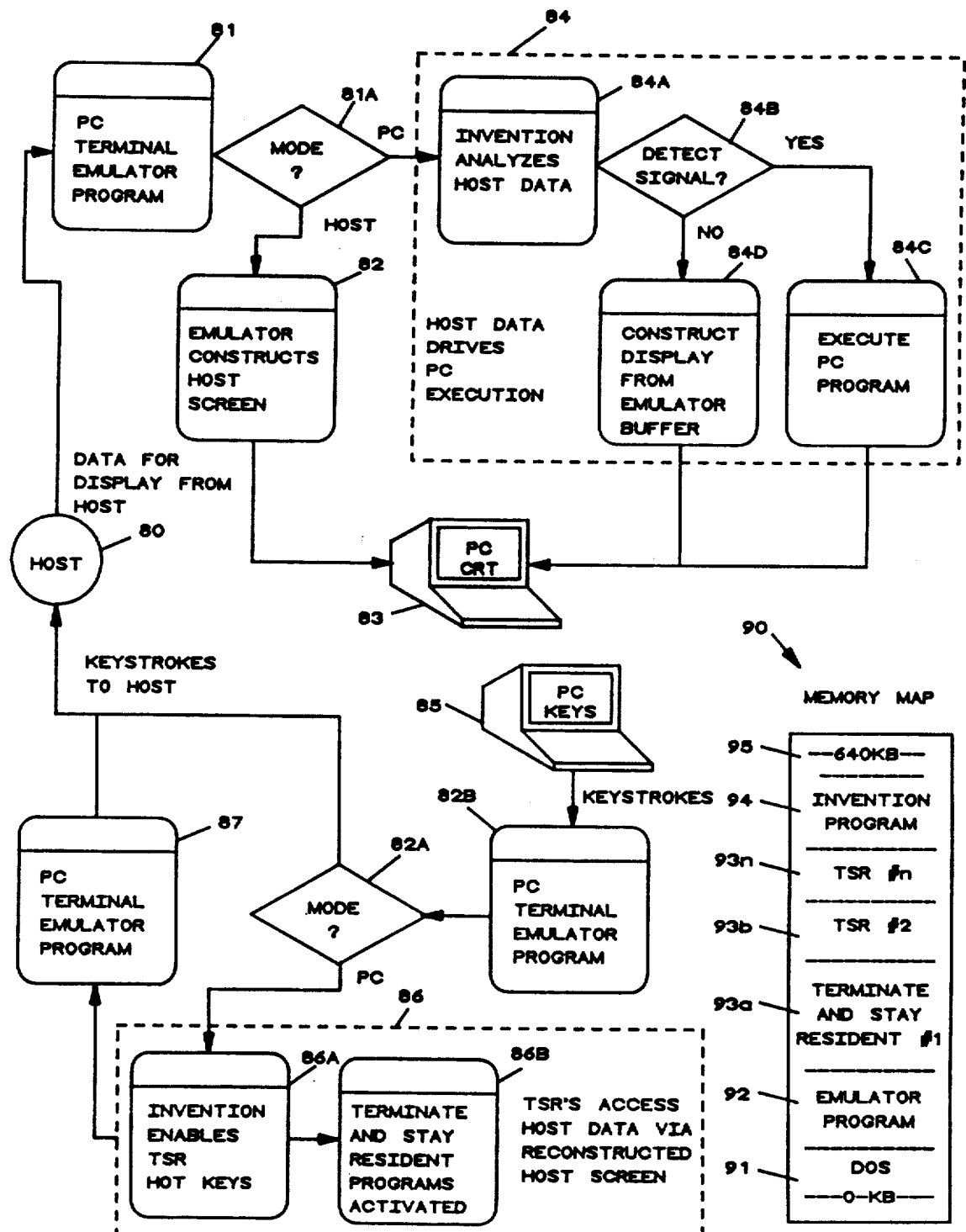
FIG. 7 is a memory map for a personal computer configured according to the invention.
FIG. 8 a flowchart-hardware portrayal of a system according to the invention showing how data from the host and keystrokes at the personal computer may each be used to call PC application programs.

FIG. 7 shows how the PC memory 90 is partitioned. The DOS operating system 91 is located in the low address portion of random access memory and the terminal emulator program 92, for example, the IBM PC 3270 Emulation Program is located at the next higher address. The next higher addresses contain the terminate and stay resident application programs 93d-93n for the personal computer. The program of this invention 94 lies in location, just above the TSR programs and the remaining memory 95 is available for general use by the system.

FIG. 8 further illustrates the fashion in which the emulation program of this invention utilizes host data to call a PC application program and the fashion in which the hot keys are used to call application programs. Beginning with the case where the host data processing system 80 supplies data to the PC for display on the PC CRT, blocks 81 and 81a of the emulation program pass the data along alternate paths dependent on whether the system is operating in the host mode or the PC mode. In the event that the system is in the host mode, the data for display is processed by block 82 of the emulator program to construct the PC screen as if it were the host screen. The screen information is then passed to the PC CRT display 83. In the alternative, PC mode, the functions contained in portion 84, are performed. Blocks 84a and 84b of the emulator program of this invention examine the host data sent to the PC for display to determine if the data contains control information. If it does, the program branches to block 84c to execute the PC application program called for by the control information. In the normal situation, the PC application program then assumes control of the CRT display 83 for the display of information associated with the application program. If the display information from the host is simply display data and does not contain control information, the program branches to block 84d, which is effective to construct the display for the CRT 83.

In the case where data is entered by means of keystrokes at keyboard 85, blocks 82A and 82B of the emulation program detect and route keystrokes in a fashion similar to blocks 81 and 81a previously discussed. If the keystrokes are made when the system is in the host mode, they are passed directly to the host as shown. However, when the system is operating in the PC mode, the function illustrated generally in portion 86 is operative and keystrokes are routed to block 86a, which examines each keystroke and sequence of keystrokes to see if a terminate and stay resident program function is specified. In the case where a terminate and stay resident program function is specified, the program branches to block 86b which is effective to actuate the portion of the program associated with the desired function. Where the keystrokes are not those which specify a terminate and stay resident program function, they are passed to the host via portion 87 of the terminal emulator program.

APPENDIX A

```
1:  0 (*$R-*)   (*Range checking off*)
2:  0 (*$B-*)   (*Boolean complete evaluation off*)
3:  0 (*$S+*)   (*Stack checking on*)
4:  0 (*$I+*)   (*I/O checking on*)
5:  0 (*$N-*)   (*No numeric coprocessor*)
6:  0 (*$M 6000,0,0*) (*stack, min. heap, max. heap*) (*HEAP SIZE WILL BE MANAGED
7:  0                        DYNAMICALLY DURING PROGRAM*)
8:  0
9:  0
10: 0 (***********************                    ****************)
11: 0
12: 0 (* This edition of SEAMLESS accepts input at the PC command line. The input *)
13: 0 (*  is processed in Unit SEAM_PC3  (SEAM_PC3.PAS). The command-line       *)
14: 0 (*  input is analyzed as to whether it is (1) a PC utilities/PC data       *)
15: 0 (*  request, or (2) a PC utility/Host data request. Some error-checking    *)
16: 0 (*  is done, and DOS is shelled-out to. THIS VERSION OF SEAMLESS USES      *)
17: 0 (*  DYNAMIC ALLOCATION FOR THE BIG SCREEN BUFFERS, AND DYNAMIC CONTROL OF *
18: 0 (*  HEAP SIZE. This makes SEAMLESS as small as possible in RAM at the time *)
19: 0 (*  that other PC utilities (e. g., editors) are loaded.                   *)
20: 0
21: 0
22: 0 PROGRAM Seamless;
23: 0
24: 0 USES CRT,
25: 0      DOS,
26: 0      Unit_Sup,
27: 0      Unit_Scn,
28: 0      Unit_Key,
29: 0      Unit_Utl,
30: 0      Unit_Mem,
31: 0      Seam_Utl,     (* Provides utility routines for SEAMLESS *)
32: 0      Seam_PC3;     (* Processes requests for PC utilities   *)
33: 0
34: 0 TYPE
35: 0   Double_Screen_Buffer = ARRAY [1..3840" OF Byte;
36: 0   DScrBufPtr =          ¬ Double_Screen_Buffer;
37: 0   Screen_Buffer =       ARRAY [1..1920" OF Byte;
```

```
38: 0  ScrBufPtr =         ¬Screen_Buffer;
39: 0
40: 0 VAR
41: 0  Ch:          Char;
42: 0  FirstTime:   Boolean;
43: 0  Error:       Integer;
44: 0  ErrorCode:   Word;
45: 0  PC_Util_Req: Boolean;
46: 0  Size:        _ProgSize;    (* used in development only *)
47: 0  ProgramSize: word;         (*  "     "        "    "   *)
48: 0
49: 0
50: 0
51: 0 PROCEDURE INNER      (VAR PC_Util_Req: Boolean;
52: 0                          FirstTime : Boolean);
53: 0
54: 0 VAR
55: 0   Extended_Attr,
56: 0   Field_Attr,
57: 0   Text_Attr:    ScrBufPtr;
58: 0   Color_Data:   DScrBufPtr;
59: 0   StuffString:  STRING;
60: 0   HeapSize1, HeapSize2: Longint;
61: 0   F1Size, F2Size:  Word;
62: 0   NewAvail:     Longint;
63: 0   ErrorCode:    Word;
64: 0
65: 0
66: 0
67: 0 (***************************** GET_INPUT ****************************)
68: 0 (* PROCEDURE  Get_Input                                             *)
69: 0 (* PURPOSE:   This is the major looping part of SEAMLESS. As long as a *)
70: 0 (*           grey minus sign is not hit, the loop intakes characters *)
71: 0 (*           from the keyboard buffer and sends them to the host. The *)
72: 0 (*           host response is received in module "Update_Screen", which *)
73: 0 (*           is called (when appropriate) by this module. The Keypad *)
74: 0 (*           "-" is a hot-key to end SEAMLESS. The Keypad "+" is a  *)
75: 0 (*           hot-key to bring user to the PC-command-line.          *)
76: 0 (* CALLED BY: Inner                                                 *)
77: 0
78: 0 PROCEDURE Get_Input    (Host: Integer;
79: 0                         FirstTime: Boolean);
80: 0
81: 0 VAR
82: 0  Ch, XCh : Char;
83: 0  ChString: STRING[15];
84: 0  Flag:     Boolean;     (* "Flag" is used when determining color
85: 0                            in which user input should show.  *)
86: 0  Password: Boolean;
87: 0  PC_Color: Integer;
88: 0  ScanCode: Byte;
89: 0  StuffString: STRING;
90: 0  X, Y, Z: Integer;
91: 0  A, B, BotScan, TopScan: Byte;    (* for Blaise _WhereScn *)
92: 0
93: 0
94: 0 (***************************** UPDATE_SCREEN ***********************)
95: 0 (* PROCEDURE   Update_Screen                                        *)
96: 0 (* PURPOSE:    refreshes the screen by reading from the HOSTSYS file. *)
97: 0 (* CALLED BY:  Get_Input                                            *)
98: 0
99: 0 PROCEDURE Update_Screen    (VAR Flag: BOOLEAN);
100: 0
```

```
101: 0      (* GLOBAL VARIABLES accessed by procedures within Update_Screen: *)
102: 0      (*      Text_Attr, Field_Attr, Extended_Attr: ScrBufPtr;   *)
103: 0      (*      NumBytes:            Integer           *)
104: 0
105: 0  VAR
106: 0      Ch:        Char;
107: 0      Flag2:     Boolean;
108: 0      ScanCode:  Byte;
109: 0      TopScan,
110: 0      BotScan:   Integer;   (* for Blaise "_WhereScn" *)
111: 0      SeamReq:   ByteArray;
112: 0      Msg:       STRING;    (* for PC-command line prompt *)
113: 0
114: 0  (******* PROCEDURE Update_Screen contains nested procedures      ***)
115: 0
116: 0
117: 0
118: 0  (************************* READSCREEN *****************************)
119: 0  (* PROCEDURE   ReadScreen                                     *)
120: 0  (* PURPOSE:   This module reads one host-screen worth of data into *)
121: 0  (*            one of three buffers (Text_Attr, Field_Attr, or     *)
122: 0  (*            Extended_Attr), as determined by the value of Buffer *)
123: 0  (*            passed in. The value of Attr passed in tells        *)
124: 0  (*            HOSTSYS whether to read text, field attributes, or  *)
125: 0  (*            extended field attributes.                  *)
126: 0  (* CALLED BY:  Update_Screen                                  *)
127: 0
128: 0  PROCEDURE ReadScreen    (Buffer: ScrBufPtr;
129: 0                          Attr:   Integer);
130: 0      (* GLOBAL VARIABLES NumBytes, Host: Integer *)
131: 0
132: 0  VAR
133: 0      Error:   Integer;         (* variable for Blaise routine *)
134: 0      NumRead: Integer;         (* variable for Blaise routine *)
135: 0      Locate_Buf : Three_Byte_Buffer;
136: 0      Which_Attr : Two_Byte_Buffer;
137: 0      I:       Integer;
138: 0
139: 1  BEGIN
140: 1          (* SET LOCATION TO READ AT 0, 0 *)
141: 1      Locate_Buf[1]" := $01;     (* HOSTSYS subfunction for Int 4403H; *)
142: 1      Locate_Buf[2]" := $00;     (* sets location to begin reading at *)
143: 1      Locate_Buf[3]" := $00;     (* 0, 0                             *)
144: 1      Regs.AX := $4403;
145: 1      Regs.BX := Host;
146: 1      Regs.CX := 3;
147: 1      Regs.DX := Ofs (Locate_Buf[1]");
148: 1      Regs.DS := Seg (Locate_Buf[1]");
149: 1      MsDos (Regs);
150: 1
151: 1          (* TELL HOSTSYS WHICH ATTRIBUTES TO READ *)
152: 1      Which_Attr[1]" := $F0;     (* HOSTSYS subfunction for Int 4403H; *)
153: 1      Which_Attr[2]" := Attr;    (* Attr = 0 for text, 1 for field,  *)
154: 1      Regs.AX := $4403;          (*      2 for extended              *)
155: 1      Regs.BX := Host;
156: 1      Regs.CX := 2;
157: 1      Regs.DX := Ofs(Which_Attr[1]");
158: 1      Regs.DS := Seg(Which_Attr[1]");
159: 1      MsDos (Regs);
160: 1
161: 1          (* READ FROM HOSTSYS FILE INTO BUFFER *)
162: 1      Regs.AX := $3F00;          (* Code copied from Blaise 3.0 *)
163: 1      Regs.BX := Host;           (* routine _ReadFil.           *)
```

```
164: 1      Regs.DS := Seg(Buffer¬ffl1");
165: 1      Regs.DX := Ofs(Buffer¬ffl1");
166: 1      Regs.CX := NumBytes;
167: 1      MsDos (Regs);
168: 0    END;       (* ReadScreen *)
169: 0
170: 0   (*********************** CONVERT_EXT_ATTR ***********************)
171: 0   (* PROCEDURE    Convert_Ext_Attr                              *)
172: 0   (* PURPOSE:    Accepts as input a buffer with host extended   *)
173: 0   (*            attributes, and converts these to the appropriate PC *)
174: 0   (*            colors to match host colors. In the case that the *)
175: 0   (*            host sends no extended attributes (ex: VM Vamp  *)
176: 0   (*            screen), field attributes are used to emulate host *)
177: 0   (*            default colors.                                 *)
178: 0   (* CALLED BY: Update_Screen                                   *)
179: 0
180: 0   PROCEDURE Convert_Ext_Attr   (VAR Extended_Attr: ScrBufPtr;
181: 0                                VAR Field_Attr:    ScrBufPtr);
182: 0                         (* NumBytes: Integer accessed globally *)
183: 0   VAR
184: 0     I:   Integer;
185: 0
186: 1   BEGIN
187: 1     FOR I := 2 TO (NumBytes) DO   (* set 0's to real numbers *)
188: 2       BEGIN
189: 2         IF Field_Attr¬ffl1" = 0 THEN
190: 2            Field_Attr¬ffl1" := Field_Attr¬ffl1-1";
191: 2         IF Extended_Attr¬ffl1" = 0 THEN
192: 2            Extended_Attr¬ffl1" := Extended_Attr¬ffl1-1" ;
193: 1       END;
194: 1
195: 1     FOR I := 1 TO (NumBytes) DO
196: 2       BEGIN
197: 2 (*     IF (Extended_Attr¬ffl1" AND 128) = 128 THEN  (* REVERSE VIDEO BIT *)
198: 2
199: 2 (* The idea is to set low 4 bits to 0, for black characters, and move    *)
200: 2 (* appropriate PC color bits into bits 4--6, for background color. It    *)
201: 2 (* doesn't work very well, it slows performance, and it looks horrible.  *)
202: 2
203: 3          CASE (Extended_Attr¬ffl1" AND 127) OF    (* set bit 7 to 0 *)
204: 3             8:  Extended_Attr¬ffl1" := 1 SHL 4;  (* dark blue *)
205: 3            16:  Extended_Attr¬ffl1" := 4 SHL 4;  (* dark red *)
206: 3            24:  Extended_Attr¬ffl1" := 5 SHL 4;  (* magenta *)
207: 3            32:  Extended_Attr¬ffl1" := 2 SHL 4;  (* dark green *)
208: 3            40:  Extended_Attr¬ffl1" := 3 SHL 4;  (* cyan *)
209: 3            48:  Extended_Attr¬ffl1" := 6 SHL 4;  (* brown *)
210: 3            56:  Extended_Attr¬ffl1" := 7 SHL 4;  (* light grey *)
211: 3          ELSE Extended_Att¬ffl1" := 7 SHL 4;
212: 2          END  (* CASE *)
213: 2       ELSE                                       *)
214: 2
215: 3          CASE Extended_Attr¬ffl1" OF
216: 3              8:  Extended_Attr¬ffl1" := 9;     (* blue *)
217: 3             16:  Extended_Attr¬ffl1" := 12;    (* red *)
218: 3             24:  Extended_Attr¬ffl1" := 13;    (* pink *)
219: 3             32:  Extended_Attr¬ffl1" := 10;    (* green *)
220: 3             40:  Extended_Attr¬ffl1" := 11;    (* turquoise *)
221: 3             48:  Extended_Attr¬ffl1" := 14;    (* yellow *)
222: 3             56:  Extended_Attr¬ffl1" := 15;    (* white *)
223: 3
224: 3               (* IF NO EXTENDED ATTRIBUTES, USE FIELD ATTRIBUTES *)
225: 3
226: 4              0:  CASE (Field_Attr¬ffl1" AND 254) OF  (* set bit 0 to 0 *)
```

```
227: 4                     0: Extended_Attr¬[I] := 10;
228: 4                     4: Extended_Attr¬[I] := 14;
229: 4                    14: Extended_Attr¬[I] := 12;
230: 4                    64: Extended_Attr¬[I] := 10;
231: 4                    76: Extended_Attr¬[I] := 0;   (* password field *)
232: 4                    92: Extended_Attr¬[I] := 10;
233: 4                    96: Extended_Attr¬[I] := 11;
234: 4                   200: Extended_Attr¬[I] := 12;
235: 4                   204: Extended_Attr¬[I] := 0;   (* password field *)
236: 4                   220: Extended_Attr¬[I] := 12;
237: 4                   224: Extended_Attr¬[I] := 11;
238: 4                   232: Extended_Attr¬[I] := 15;
239: 4                   240: Extended_Attr¬[I] := 11;
240: 4                   248: Extended_Attr¬[I] := 15;
241: 4                   ELSE Extended_Attr¬[I] := 6;  (* brown *)
242: 3                   END;      (* CASE *)
243: 3    (*!!! THIS DOES NOT YET INCORPORATE REVERSE VIDEO, UNDERSCORE, ETC. !!*)
244: 3              ELSE Extended_Attr¬[I] := 7;      (* grey *)
245: 2         END;        (* CASE *)
246: 1       END;          (* FOR *)
247: 0     END;            (* Convert_Ext_Attr *)
248: 0
249: 0
250: 0    (************************ PRINT_SCREEN ************************)
251: 0    (* PROCEDURE   Print_Screen                                   *)
252: 0    (* PURPOSE:    merges text- and extended-attributes into single *)
253: 0    (*            buffer, which is sent to video screen using BLAISE *)
254: 0    (*            routine "FastScn".                               *)
255: 0    (* CALLED BY:  Update_Screen                                  *)
256: 0
257: 0    PROCEDURE Print_Screen    (Text_Attr:    ScrBufPtr;
258: 0                               Extended_Attr: ScrBufPtr;
259: 0                               Color_Data:    DScrBufPtr);
260: 0                      (* NumBytes: Integer accessed globally *)
261: 0    VAR
262: 0      I, J:     Integer;
263: 0
264: 1    BEGIN
265: 1      (* This loop merges the text and extended-attribute buffers into *)
266: 1      (* one single buffer, in alternating order... char, attr, char,  *)
267: 1      (* attr...                                                 *)
268: 1      J := 1;
269: 1      FOR I := 1 TO (NumBytes) DO
270: 2        BEGIN
271: 2          IF (Field_Attr¬[I] AND 12) = 12 THEN  (* IF PASSWORD FIELD, *)
272: 2            Text_Attr¬[I] := 0;             (* SET TEXT TO NULLS *)
273: 2          Color_Data¬[J] := Text_Attr¬[I];
274: 2          J := J + 1;
275: 2          Color_Data¬[J] := Extended_Attr¬[I];
276: 2          J := J + 1;
277: 1        END;
278: 1        FastScn (1, 1, @Color_Data¬[I], NumBytes, 0, 0, 2);
279: 0    END;                       (* Blaise Pascal Routine *)
280: 0
281: 0
282: 0
283: 0    (******************** PROCEDURE CHECK_PC_UTIL ********************)
284: 0    (* This procedure uses REXX Exec's on VM to gain information, and has *)
285: 0    (* been temporarily decomissioned. Jeff Boston feels it may be the *)
286: 0    (* only way to interface with menus on VM.                    *)
287: 0
288: 0    PROCEDURE Check_PC_Util_Req;  (* accesses PC_Util_Req and Message *)
289: 0                         (*    globally                       *)
```

```
290: 0
291: 0    VAR
292: 0      SeamReq: STRING;
293: 0
294: 1    BEGIN
295: 1      SeamReq := '        ';    (* to initialize length byte *)
296: 1      _ReadScn(1, 1, @SeamReq[1],8,_CHNOMOVE_SCN);
297: 1      IF SeamReq = 'SEAMLESS' THEN
298: 2        BEGIN
299: 2          PC_Util_Req := TRUE;
300: 2          _ReadScn(1, 1, @Message, 160,0);
301: 1        END
302: 1      ELSE
303: 1        PC_Util_Req := FALSE;
304: 0    END;
305: 0
306: 0
307: 1    BEGIN           (****** PROCEDURE UPDATE_SCREEN **)
308: 1      Flag := TRUE;
309: 1      Flush_Host;
310: 1      ReadScreen (Text_Attr, 0);
311: 1      ReadScreen (Field_Attr, 1);
312: 1      ReadScreen (Extended_Attr, 2);
313: 1      Convert_Ext_Attr (Extended_Attr, Field_Attr);
314: 1      Print_Screen (Text_Attr, Extended_Attr, Color_Data);
315: 1 (*   Check_PC_Util_Req;
316: 1      IF PC_Util_Req THEN
317: 1        BEGIN
318: 1          SendKey ('fflclear"');
319: 1          EXIT;
320: 1        END;     *)
321: 1      Msg := '= = > > ';
322: 1      _FastScn(6,25,@Msg[1],Length(Msg),12,_BLACK,_USEATTR_SCN);
323: 1      Msg := ' Depress grey "+" to use PC command line';
324: 1      _FastScn(11,25,@Msg[1],Length(Msg),_LIGHTGRAY,_BLACK,_USEATTR_SCN);
325: 1      Place_Cursor (0, 0, 0);
326: 1      Host_Thinking;
327: 1
328: 1      WHILE NOT KeyPressed DO        (*********** NOTE !!! **********)
329: 2        BEGIN                        (* USE OF 'EXIT' STATEMENT IS   *)
330: 2          Flush_Host;                (* EXCEPTIONAL, AND IS DONE TO  *)
331: 2          IF KeyPressed THEN EXIT;   (* MAXIMIZE SPEED OF RETURN TO  *)
332: 2          ReadScreen (Text_Attr, 0); (* MODULE 'GET_INPUT', WHICH    *)
333: 2          IF KeyPressed THEN EXIT;   (* PROCESSES ALL KEYSTROKES.    *)
334: 2          ReadScreen (Field_Attr, 1);(* (normally, the use of EXIT is *)
335: 2          IF KeyPressed THEN EXIT;    (* avoided as not consistent with *)
336: 2          ReadScreen (Extended_Attr, 2); (* structured programming. ********)
337: 2          IF KeyPressed THEN EXIT;
338: 2          Convert_Ext_Attr (Extended_Attr, Field_Attr);
339: 2          IF KeyPressed THEN EXIT;
340: 2          Print_Screen (Text_Attr, Extended_Attr, Color_Data);
341: 2 (*       Check_PC_Util_Req;
342: 2          IF PC_Util_Req THEN
343: 2            BEGIN
344: 2              SendKey ('fflclear"');
345: 2              EXIT;
346: 2            END;         *)
347: 2          IF KeyPressed THEN EXIT;
348: 2          Place_Cursor (0, 0, 0);
349: 2          (* IF KeyPressed THEN EXIT;
350: 2          Host_Thinking;*)
351: 1        END;             (* WHILE *)
352: 0    END;          (* Update_Screen *)
```

```
353: 0
354: 0
355: 0 (*************************  PC_COMMAND_LINE  *********************)
356: 0 PROCEDURE PC_Command_Line (VAR PC_Util_Req: Boolean);
357: 0          (* Message accessed globally *)
358: 0 VAR
359: 0   I:        Integer;
360: 0   StuffString: STRING;
361: 0
362: 1 BEGIN
363: 1   Place_Cursor (1, 24, 10);
364: 1   _COffScn(TRUE);
365: 1   FOR I := 1 TO 60 DO         (* erase instruction *)
366: 1     Write (' ');
367: 1   Place_Cursor (1, 24, 10);
368: 1   _COffScn(FALSE);
369: 1   TextColor (15);
370: 1   IF EOLN THEN Readln;
371: 1   Read (Message);
372: 1   IF (Length(Message) = 0) THEN
373: 1     PC_Util_Req := FALSE
374: 1   ELSE
375: 1     PC_Util_Req := TRUE;
376: 0 END;          (* PC_Command_Line *)

377: 0
378: 0
379: 1 BEGIN   (*** Get_Input ***)
380: 1   Update_Screen (Flag);
381: 1   Place_Cursor (0, 0, 0);
382: 1   _CSetScn (_CBottom);
383: 1   _COffScn (FALSE);
384: 1   Flag := TRUE;               (* 'Flag' controls checking for VM *)
385: 1                               (* colors at the first printable *)
386: 1   Ch := _ExInKey (TRUE, ScanCode);  (* char following a screen update *)
387: 1
388: 1   WHILE ScanCode <> 74 DO     (* pad minus sign *)
389: 2     BEGIN
390: 2       IF ORD(Ch) = 0 THEN     (* no character returned; ASCII 0 *)
391: 3         BEGIN
392: 4           CASE ScanCode OF
393: 5             59: BEGIN SendKey ('fflpf1"');
394: 4                     Update_Screen (Flag); END;
395: 5             60: BEGIN SendKey ('fflpf2"');
396: 4                     Update_Screen (Flag); END;
397: 5             61: BEGIN SendKey ('fflpf3"');
398: 4                     Update_Screen (Flag); END;
399: 5             62: BEGIN SendKey ('fflpf4"');
400: 4                     Update_Screen (Flag); END;
401: 5             63: BEGIN SendKey ('fflpf5"');
402: 4                     Update_Screen (Flag); END;
403: 5             64: BEGIN SendKey ('fflpf6"');
404: 4                     Update_Screen (Flag); END;
405: 5             65: BEGIN SendKey ('fflpf7"');
406: 4                     Update_Screen (Flag); END;
407: 5             66: BEGIN SendKey ('fflpf8"');
408: 4                     Update_Screen (Flag); END;
409: 5             67: BEGIN SendKey ('fflpf9"');
410: 4                     Update_Screen (Flag); END;
411: 5             68: BEGIN SendKey ('fflpf10"');
412: 4                     Update_Screen (Flag); END;
413: 4             15: SendKey ('fflbacktab"');
414: 4             69: ;
415: 4             70: ;
```

```
416: 4          71: SendKey ('mhome'");            (* Home *)
417: 4          72: SendKey ('mup'");              (* up arrow *)
418: 4          73: ;                              (* page up *)
419: 4          75: SendKey ('mleft'");            (* left arrow *)
420: 4          77: SendKey ('mright'");           (* right arrow *)
421: 4          79: SendKey ('mfastright'");       (* End key *)
422: 4          80: SendKey ('mdown'");            (* down arrow *)
423: 4          81: ;                              (* page down *)
424: 4          82: SendKey ('minsert'");          (* insert *)
425: 5          83: BEGIN  SendKey ('mdelete'");   (* delete *)
426: 4                     Update_Screen (Flag); END;
427: 5         104: BEGIN  SendKey ('mpf11'");
428: 4                     Update_Screen (Flag); END;
429: 5         105: BEGIN  SendKey ('mpf12'");
430: 4                     Update_Screen (Flag); END;
431: 5         112: BEGIN  SendKey ('mpa1'");
432: 4                     Update_Screen (Flag); END;
433: 5         113: BEGIN  SendKey ('mpa2'");
434: 4                     Update_Screen (Flag); END;
435: 4         120: ;      (* ChangeColors (Attr_Table); *)   (* ALT-1 *)
436: 4                     (* Update_Screen (Flag) *)
437: 3       END;    (* CASE *)
438: 2       END     (* IF Ch = NUL *)
439: 2       ELSE    (* Ch <> NUL *)
440: 3         CASE ScanCode OF
441: 4          28: BEGIN  SendKey ('menter'");
442: 3                     Update_Screen (Flag); END;
443: 4           1: BEGIN  SendKey ('mclear'");    (* ESC key *)
444: 3                     Update_Screen (Flag); END;
445: 4          14: BEGIN  _WhereScn (A, B, TopScan, BotScan);
446: 4                     Y := B;
447: 4                     X := A;
448: 4                     Place_Cursor (1, (Y - 1), (X - 2));
449: 4                     Write (' ');
450: 3                     SendKey ('mbackspace'"); END;
451: 3          15:        SendKey ('mtab'");
452: 3          78: (*     SendKey ('mnewline'"); *)   (* grey plus sign *)
453: 3
454: 3 (*WE ARE TEMPORARILY ASSUMING THAT USER MUST NOT ACCESS PC COMMAND LINE *)
455: 3 (*EXCEPT WITHIN VM ENVIRONMENT THAT HAS TRUE COMMAND LINE (e. g., XEDIT,*)
456: 3 (*FILELIST, ETC.                                            *)
457: 4             BEGIN
458: 4               SendKey ('mclear'");   (*to get to command line*)
459: 4                                     (*on VM side           *)
460: 4               PC_Command_Line (PC_Util_Req);
461: 4               IF PC_Util_Req THEN EXIT
462: 4               ELSE Update_Screen (Flag);
463: 3             END;
464: 4       ELSE BEGIN
465: 4               IF Flag THEN           (* 1st char after <ENTER> *)
466: 5                 BEGIN
467: 5                   Get_Host_Stats (HostStats);
468: 5                   X := HostStats[m5'";   (* cursor col *)
469: 5                   Y := HostStats[m4'";   (* cursor row *)
470: 5                   Z := (Y * 80) + X;
471: 5                   TextColor (Extended_Attr¬mZ'");
472: 5                   Flag := FALSE;
473: 4                 END;
474: 4
475: 4 (* BITS 2 AND 3 COME ON FOR NON-DISPLAYED FIELDS, I. E. PASSWORDS. TO   *)
476: 4 (* PROTECT PASSWORDS, THE VARIABLE 'Ch' IS SENT TO THE HOST, WHILE THE  *)
477: 4 (* VARIABLE 'XCh' IS PRINTED TO THE PC SCREEN. IN THE CASE OF PASSWORD *)
478: 4 (* FIELDS, 'XCh' IS CONVERTED TO THE NULL CHARACTER.                   *)
```

```
479: 4
480: 4 (* If password field *)  IF (Field_Attr¬"ffIZ" AND 12) = 12 THEN
481: 4 (* convert to NULL, *)     XCh := Chr(0)
482: 4 (* else              *) ELSE
483: 4 (* leave as is.      *)    XCh := Ch;
484: 4                            Write (XCh);
485: 4
486: 4                            ChString := Ch;
487: 4                            SendKey (ChString);
488: 3                          END;
489: 2      END;       (* CASE *)
490: 2      Place_Cursor (0, 0, 0);
491: 2 (*   IF PC_Util_Req THEN EXIT;       (* return to driver *)*)
492: 2      Ch := _ExInKey (TRUE, ScanCode)
493: 1   END;     (* WHILE *)
494: 0 END;       (* GetInPut *)
495: 0
496: 0 (************************* MAIN PROGRAM *************************)
497: 1 BEGIN       (* Inner *)
498: 1   _HeapMem(10000,NewAvail,ErrorCode); (* Set heap to accomodate dynamically *)
499: 1                          (* allocated big buffers      *)
500: 1   IF FirstTime THEN          (* Only open a host file upon the first *)
501: 2    BEGIN                     (* time through.                        *)
502: 2     Open_Host (Host);
503: 2                         (* stuff a null ch. into keyboard buf. *)
504: 2     StuffString := #0;   (* the 1st time, so pop-ups work right *)
505: 2     StuffString := _StuffKey (StuffString);
506: 1    END
507: 1   ELSE
508: 1     SendKey ('fficlear'");
509: 1   PC_Util_Req := FALSE;
510: 1   Get_Host_Stats (HostStats);
511: 1   NumRows := HostStatsfn2";      (* These three variables are accessed *)
512: 1   NumCols := HostStatsfn3";      (* globally by all procedures.        *)
513: 1   NumBytes := NumRows * NumCols;
514: 1   Mark(Text_Attr);
515: 1   New(Text_Attr);
516: 1   New(Field_Attr);
517: 1   New(Extended_Attr);
518: 1   New(Color_Data);
519: 1   Get_Input (Host, FirstTime);
520: 1 (* HeapSize1 := _TopHpMem(F1Size);*)
521: 1   Release (Text_Attr);
522: 1 (* _HeapMem(0,NewAvail,ErrorCode);*)
523: 1 (* ProgramSize := _SizeMem(Size);
524: 1   writeln ('code size: ',(16*longint(Size._CodeSize)));
525: 1   writeln ('data size ',(16*longint(Size._Datasize)));
526: 1   writeln ('Stack size: ',(16*longint(Size._StackSize)));
527: 1   writeln ('Heap size: ',(16*longint(Size._HeapSize)));
528: 1   writeln ('Total size: ',ProgramSize, 'bytes');          *)
529: 1
530: 1   IF NOT PC_Util_Req THEN
531: 2    BEGIN
532: 2     Regs.AX := $3E00;          (* to close file *)
533: 2     Regs.BX := Host;
534: 2     MsDos(Regs);
535: 2     ClrScr;
536: 1    END;
537: 0 END;  (* inner *)
538: 0
539: 0
540: 0
541: 1 BEGIN     (* DRIVER *)
```

```
542: 1  ClrScr;
543: 1  PC_Util_Req := FALSE;
544: 1  FirstTime := TRUE;
545: 1  Inner (PC_Util_Req, FirstTime);
546: 1  FirstTime := FALSE;      (* so as not to open another HOSTSYS file   *)
547: 1                           (* upon return to inner program             *)
548: 1  WHILE PC_Util_Req DO
549: 2    BEGIN
550: 2      Process_PC_Util_Req (Message);   (* process PC-command-line request *)
551: 2      Inner (PC_Util_Req, FirstTime);  (* "Classic" SEAMLESS              *)
552: 1    END;
553: 0  END.
```

| | |
|---|---|
| A | 91 445 447 |
| ATTR | 129 153 |
| AX | 144 154 162 532 |
| B | 91 445 446 |
| BOOLEAN | 42 45 51 52 79 84 86 99 107 356 |
| BOTSCAN | 91 110 445 |
| BUFFER | 128 164 165 |
| BX | 145 155 163 533 |
| BYTE | 35 37 88 91 108 |
| BYTEARRAY | 111 |
| CH | 41 82 |
| CHAR | 41 82 106 |
| CHECK_PC_UTIL_REQ | 288 |
| CHR | 481 |
| CHSTRING | 83 486 487 |
| CLRSCR | 535 542 |
| COLOR_DATA | 58 259 273 275 278 314 340 518 |
| CONVERT_EXT_ATTR | 180 313 338 |
| CRT | 24 |
| CX | 146 156 166 |
| DOS | 25 |
| DOUBLE_SCREEN_BUFFER | 35 36 |
| DS | 148 158 164 |
| DSCRBUFPTR | 36 58 259 |
| DX | 147 157 165 |
| E00 | 532 |
| EOLN | 370 |
| ERROR | 43 133 |
| ERRORCODE | 44 63 498 |
| EXIT | 331 333 335 337 339 347 461 |
| EXTENDED_ATT | 211 |
| EXTENDED_ATTR | 55 180 191 192 203 204 205 206 207 208 209 210 215 216 |
| F0 | 152 |
| F00 | 162 |
| F1SIZE | 61 |
| F2SIZE | 61 |
| FALSE | 303 368 373 383 472 509 543 546 |
| FIELD_ATTR | 56 181 189 190 226 271 311 313 334 338 480 516 |
| FIRSTTIME | 42 52 79 500 519 544 545 546 551 |
| FLAG | 84 99 308 380 384 394 396 |
| FLAG2 | 107 |
| FLUSH_HOST | 309 330 |
| GET_HOST_STATS | 467 510 |
| GET_INPUT | 78 519 |
| HEAPSIZE1 | 60 |
| HEAPSIZE2 | 60 |
| HOST | 78 145 155 163 502 519 533 |
| HOSTSTATS | 467 468 |

| | |
|---|---|
| HOST_THINKING | 326 |
| I | 137 184 |
| INNER | 51 545 551 |
| INTEGER | 43 78 |
| J | 262 268 273 274 275 276 |
| KEYPRESSED | 328 331 333 335 337 339 347 |
| LENGTH | 322 324 372 |
| LOCATE_BUF | 135 141 142 143 |
| LONGINT | 60 62 |
| MARK | 514 |
| MESSAGE | 300 371 372 550 |
| MSDOS | 149 159 167 534 |
| MSG | 112 321 322 323 324 |
| NEW | 515 516 517 518 |
| NEWAVAIL | 62 498 |
| NUMBYTES | 166 187 195 269 278 513 |
| NUMCOLS | 512 513 |
| NUMREAD | 134 |
| NUMROWS | 511 513 |
| OFS | 147 157 165 |
| OPEN_HOST | 502 |
| ORD | 390 |
| PASSWORD | 86 |
| PC_COLOR | 87 |
| PC_COMMAND_LINE | 356 460 |
| PC_UTIL_REQ | 45 51 299 303 356 373 375 |
| PLACE_CURSOR | 325 348 363 367 381 448 490 |
| PRINT_SCREEN | 257 314 340 |
| PROCESS_PC_UTIL_REQ | 550 |
| PROGRAMSIZE | 47 |
| READ | 371 |
| READLN | 370 |
| READSCREEN | 128 310 311 312 332 334 336 |
| REGS | 144 145 146 147 148 149 154 155 156 157 158 159 162 163 164 165 166 167 532 533 534 |
| RELEASE | 521 |
| SCANCODE | 88 108 386 388 |
| SCRBUFPTR | 38 57 128 180 181 257 258 |
| SCREEN_BUFFER | 37 38 |
| SEAMLESS | 22 |
| SEAMREQ | 111 292 295 296 297 |
| SEAM_PC3 | 32 |
| SEAM_UTL | 31 |
| SEG | 148 158 164 |
| SENDKEY | 393 395 397 399 |
| SIZE | 46 |
| STUFFSTRING | 59 89 360 504 505 |
| TEXTCOLOR | 369 471 |
| TEXT_ATTR | 57 257 272 273 |
| THREE_BYTE_BUFFER | 135 |
| TOPSCAN | 91 109 445 |
| TRUE | 299 308 364 375 384 386 492 544 |
| TWO_BYTE_BUFFER | 136 |
| UNIT_KEY | 28 |
| UNIT_MEM | 30 |
| UNIT_SCN | 27 |
| UNIT_SUP | 26 |
| UNIT_UTL | 29 |
| UPDATE_SCREEN | 99 380 394 396 398 400 402 404 406 408 410 412 426 428 430 432 434 442 444 462 |
| WHICH_ATTR | 136 152 153 157 158 |
| WORD | 44 47 61 63 |
| WRITE | 366 449 484 |

```
X                  90  447 448 468 470
XCH                82  481 483 484
Y                  90  446 448 469 470
Z                  90  470 471 480
_BLACK             322 324
_CBOTTOM           382
_CHNOMOVE_SCN      296
_LIGHTGRAY         324
_PROGSIZE          46
_USEATTR_SCN       322 324
_COFFSCN           364 368 383
_CSETSCN           382
_EXINKEY           386 492
_FASTSCN           278 322 324
_HEAPMEM           498
_READSCN           296 300
_STUFFKEY          505
_WHERESCN          445
```

15 Nov 1988 AT 12:48:07 Formated Listing for: O:SEAM_UTL.PAS
Line: B  Statement

```
 1:  0
 2:  0 (* UNIT Seam_Utl provides utility procedures for SEAMLESS. These involve *)
 3:  0 (* many of the Interrupts that are used to communicate with the HOSTSYS  *)
 4:  0 (* file. These are well-worked-out and should not require further        *)
 5:  0 (* debugging.                                                            *)
 6:  0 (* AMY G. SALZMAN     6-28-88                                            *)
 7:  0
 8:  0
 9: -1 UNIT SEAM_UTL;
10: -1
11: -1 INTERFACE
12: -1
13: -1   USES  DOS,
14: -1         CRT,
15: -1         Unit_Sup,
16: -1         Unit_Utl,
17: -1         Unit_Scn,
18: -1         Unit_Key,
19: -1         Unit_Fil,
20: -1         Unit_Str;
21: -1
22: -1
23: -1 TYPE
24: -1   ByteArray       =   ARRAY ffl1..8" OF Byte;
25: -1   Three_Byte_Buffer =   ARRAYffl1..3" OF Byte;
26: -1   Two_Byte_Buffer   =   ARRAYffl1..2" OF Byte;
27: -1
28: -1 VAR
29: -1   ChString:    STRING;
30: -1   Host:        Integer;
31: -1   HostStats:   ByteArray;
32: -1   NumBytes:    Integer;     (* NumCols * NumRows *)
33: -1   NumCols:     Integer;     (* number of columns on host screen *)
34: -1   NumRows:     Integer;     (* number of rows on host screen *)
35: -1   Regs:        Registers;
36: -1   Y, X:        Integer;
37: -1
38: -1   PROCEDURE Open_Host (VAR Host: Integer);
39: -1   PROCEDURE Get_Host_Stats (VAR HostStats: ByteArray);
40: -1   PROCEDURE Place_Cursor (Flag, Y, X: Integer);
41: -1   PROCEDURE SendKey (ChString: STRING);
```

```
42: -1    PROCEDURE Flush_Host;
43: -1    PROCEDURE Host_Thinking;
44: -1
45: -1
46: -1 IMPLEMENTATION
47: -1
48: -1 (***************************  OPEN_HOST  ****************************)
49: -1 (* PROCEDURE   Open_Host                                          *)
50: -1 (* PURPOSE:   Opens a file for host driver, sets driver in binary mode, *)
51: -1 (*           and turns off CRLF.                                  *)
52: -1 (* CALLED BY:  Called once, at beginning of program               *)
53: -1
54: -1 PROCEDURE Open_Host;
55: -1
56: -1 TYPE
57: -1   Path  =    STRING[167];          (* from Blaise 3.0 *)
58: -1
59: -1 VAR
60: -1   CRLF_Buf : Three_Byte_Buffer;
61: -1   HostName: Path;
62: -1   PathZ:    Path;
63: -1   PathLen : Integer;
64: -1
65:  0 BEGIN
66:  0   HostName := 'Host';              (* code copied from Blaise 3.0    *)
67:  0   PathLen := Length (HostName);    (* procedure __OpenFil           *)
68:  0   Move (HostName[1", PathZ, PathLen);
69:  0   PathZ[PathLen" := #0;
70:  0   Regs.AX := ($3D SHL 8) OR 2;    (* for read/write access *)
71:  0   Regs.DS := Seg(PathZ);
72:  0   Regs.DX := Ofs(PathZ);
73:  0   MsDos(Regs);
74:  0
75:  0   Host := Regs.AX;                 (* AX returns host handle no.  *)
76:  0   Regs.BX := Host;                 (* get device information--??  *)
77:  0   Regs.AX := $4400;
78:  0   MsDos(Regs);
79:  0
80:  0   Regs.AX := $4401;                (* set the HOSTSYS device driver *)
81:  0   Regs.DH := 0;                    (* in BINARY MODE to improve   *)
82:  0   Regs.DL := Regs.DL OR $20;       (* performance                 *)
83:  0   MsDos(Regs);
84:  0
85:  0   CRLF_Buf[1" := $F5;              (* this section is to turn off *)
86:  0   CRLF_Buf[2" := $00;              (* carriage-return/line feed   *)
87:  0   Regs.AX := $4403;
88:  0   Regs.BX := Host;
89:  0   Regs.CX := 2;
90:  0   Regs.DX := Ofs (CRLF_Buf[1");
91:  0   Regs.DS := Seg (CRLF_Buf[1");
92:  0   MsDos (Regs);
93: -1 END;              (* Open_Host *)
94: -1
95: -1
96: -1 (***************************  GET_HOST_STATS  ****************************)
97: -1 (* PROCEDURE Get_Host_Stats                                       *)
98: -1 (* PURPOSE:  obtains diverse status information about host        *)
99: -1 (* CALLED BY:  Place_Cursor, Main Program, Host_Thinking          *)
100: -1
101: -1 PROCEDURE Get_Host_Stats;
102: -1
103:  0 BEGIN
104:  0   Regs.AX := $4402;
105:  0   Regs.BX := Host;                 (* "Host" accessed globally *)
```

```
106:  0   Regs.CX := 8;
107:  0   Regs.DX := Ofs(HostStatsffl1");
108:  0   Regs.DS := Seg(HostStatsffl1");
109:  0   MsDos (Regs);
110: -1 END;        (* Get_Host_Stats *)
111: -1
112: -1
113: -1
114: -1 (************************ PLACE_CURSOR ************************)
115: -1 (* PROCEDURE Place_Cursor                                   *)
116: -1 (* PURPOSE:   Places PC cursor EITHER at a program-decided location, *)
117: -1 (*            OR at the current location of the host cursor   *)
118: -1 (* CALLED BY: Update_Screen, Get_Input                        *)
119: -1
120: -1 PROCEDURE Place_Cursor;
121: -1
122: -1 VAR
123: -1   Cursor_col: Integer;
124: -1   Cursor_row: Integer;
125: -1
126:  0 BEGIN
127:  0   IF Flag = 1 THEN          (* For SEAMLESS to write screen messages *)
128:  1    BEGIN                    (* at a program-specified cursor   *)
129:  1      Cursor_row := Y;       (* location.                        *)
130:  1      Cursor_col := X;
131:  0    END
132:  0   ELSE
133:  1    BEGIN
134:  1      Get_Host_Stats (HostStats);   (* Find current cursor position *)
135:  1      Cursor_row := HostStatsffl4"; (* on host; use to place PC    *)
136:  1      Cursor_col := HostStatsffl5"; (* cursor                       *)
137:  0    END;
138:  0   Regs.AH := $02;
139:  0   Regs.BH := $00;            (* Interrupt 10H, function 0200H will *)
140:  0   Regs.DH := Cursor_row;     (* place PC cursor at desired position *)
141:  0   Regs.DL := Cursor_col;
142:  0   Intr ($10, Regs);
143: -1 END;       (* Place_Cursor *)
144: -1
145: -1
146: -1
147: -1 (************************ SENDKEY ************************)
148: -1 (* PROCEDURE   SendKey                                    *)
149: -1 (* PURPOSE:    Sends a single character to HOST file       *)
150: -1 (* CALLED BY:  Get_Input, Host_Thinking                    *)
151: -1
152: -1 PROCEDURE SendKey;
153: -1
154:  0 BEGIN
155:  0   Regs.AX := $4000;          (* TP4PROCS.PAS, procedure *)
156:  0   Regs.BX := Host;           (* Write_HostSys.          *)
157:  0   Regs.CX := Length (ChString);
158:  0   Regs.DS := Seg (ChStringffl1");
159:  0   Regs.DX := Ofs (ChStringffl1");
160:  0   Intr ($21, Regs);
161: -1 END;       (*** SendKey ***)
162: -1
163: -1
164: -1
165: -1 (************************ FLUSH_HOST ************************)
166: -1 (* PROCEDURE   Flush_Host                                   *)
167: -1 (* PURPOSE:    clears the text and attribute buffers of HOSTSYS *)
168: -1 (* CALLED BY:  Update_Screen                                *)
169: -1
```

```
170: -1 PROCEDURE Flush_Host;
171: -1  VAR
172: -1    Flush_Buf: Byte;
173: -1
174:  0 BEGIN
175:  0    Flush_Buf := $FA;
176:  0    Regs.AX := $4403;
177:  0    Regs.BX := Host;
178:  0    Regs.CX := 1;
179:  0    Regs.DX := Ofs(Flush_Buf);
180:  0    Regs.DS := Seg(Flush_Buf);
181:  0    MsDos (Regs);
182: -1 END;   (* Flush_Host *)
183: -1
184: -1
185: -1
186: -1 (***************************** HOST_THINKING ***********************)
187: -1 (* PROCEDURE Host_Thinking                                        *)
188: -1 (* PURPOSE:   Prints bottom-of-screen message that indicates host status. *)
189: -1 (* CALLED BY: Update_Screen                                       *)
190: -1
191: -1 PROCEDURE Host_Thinking;   (* GLOBALLY accesses NumRows, NumCols *)
192: -1
193: -1 VAR
194: -1   HostStats: ByteArray;
195: -1   Msg:       STRING;
196: -1
197:  0 BEGIN
198:  0   Get_Host_Stats (HostStats);
199:  0     (* bit 5 set means input to host is inhibited *)
200:  0   IF ((HostStatsffl1" AND 32) = 32) THEN SendKey ('fflreset'")
201:  0     (* bit 4 set means system not available *)
202:  0   ELSE IF ((HostStatsffl1" AND 16) = 16) THEN
203:  1     BEGIN
204:  1     Msg := '4B      X ffl'";
205:  1     _FastScn(2,25,@Msgffl1",Length(Msg),10,_BLACK,_USEATTR_SCN);
206:  0     END
207:  0   ELSE
208:  1     BEGIN
209:  1     Msg := '4B';
210:  1     _FastScn(2,25,@Msgffl1",Length(Msg),10,_BLACK,_USEATTR_SCN);
211:  0     END;
212: -1 END;    (* Host_Thinking *)
213: -2 END.    (* SeamUtl *)
```

| | | | | | |
|---|---|---|---|---|---|
| AH | 138 | | | | |
| AX | 70 | 75 | | | |
| BH | 139 | | | | |
| BX | 76 | 88 | 105 | 156 | 177 |
| BYTE | 24 | 25 | 26 | 172 | |
| BYTEARRAY | 24 | 31 | 39 | 194 | |
| CHSTRING | 29 | 41 | 157 | 158 | 159 |
| CRLF_BUF | 60 | 85 | 86 | 90 | 91 |
| CRT | 14 | | | | |
| CURSOR_COL | 123 | 130 | 136 | 141 | |
| CURSOR_ROW | 124 | 129 | 135 | 140 | |
| CX | 89 | 106 | 157 | 178 | |
| D | 70 | | | | |
| DH | 81 | 140 | | | |
| DL | 82 | 141 | | | |
| DOS | 13 | | | | |
| DS | 71 | 91 | 108 | 158 | 180 |
| DX | 72 | 90 | 107 | 159 | 179 |
| F5 | 85 | | | | |

```
FA               175
FLAG             40 127
FLUSH_BUF        172 175 179 180
FLUSH_HOST       42 170
GET_HOST_STATS   39 101 134 198
HOST             30 38 75 76 88 105 156 177
HOSTNAME         61 66 67 68
HOSTSTATS        31 39 107 108 134 135 136 194 198 200 202
HOST_THINKING    43 191
IMPLEMENTATION   46
INTEGER          30 32 33 34 36 38 40 63 123 124
INTR             142 160
LENGTH           67 157 205 210
MOVE             68
MSDOS            73 78 83 92
MSG              195 204 205 209 210
NUMBYTES         32
NUMCOLS          33
NUMROWS          34
OFS              72 90 107 159 179
OPEN_HOST        38 54
PATH             57 61 62
PATHLEN          63 67 68 69
PATHZ            62 68 69 71 72
PLACE_CURSOR     40 120
REGISTERS        35
REGS             35 70
SEAM_UTL         9
SEG              71 91 108 158 180
SENDKEY          41 152 200
THREE_BYTE_BUFFER 25 60
TWO_BYTE_BUFFER  26
UNIT_FIL         19
UNIT_KEY         18
UNIT_SCN         17
UNIT_STR         20
UNIT_SUP         15
UNIT_UTL         16
X                36 40 130
Y                36 40 129
_BLACK           205 210
_USEATTR_SCN     205 210
_FASTSCN         205 210
```

We claim:

1. In a computing system including a host computer, a personal computer having a display and a keyboard and containing a terminate and stray resident application program which processes data in a first format resident in said personal computer, and a PC/host terminal emulation program means resident in said personal computer and communicating with said host computer which processes data in a second format, said computing system further comprising:
   a. screen data conversion means within said personal computer coupled to said PC/host terminal emulation program means for constructing a display screen for said data processed by said host computer in said second format;
   b. A keystroke interpretation routine resident within said personal computer for distinguishing between personal computer commands and host computer commands entered from said keyboard;
   c. means coupled to said keystroke interpretation routine and responsive to said identified personal computer commands to said terminate and stay resident application program for processing in said first format; and,
   d. means coupled to said keystroke interpretation routine for passing host computer commands representing changes to said screen data to said host computer via said PC/host terminal emulation program means for processing in said second format.

2. A system according to claim 1 wherein said screen data conversion means includes a subroutine for converting host computer data in said second format to the format of said personal computer.

3. A system according to claim 2 wherein said screen data conversion means includes a personal computer buffer load routine for storing said converted host computer data in the personal computer display buffer.

4. A system according to claim 1 wherein said keystroke interpretation routine includes a first subroutine for determination of whether a keystroke is a host computer command or a personal computer command.

5. A system according to claim 4 wherein said keystroke interpretation routine includes means responsive to said first subroutine for conveying said host computer commands to said host for execution and for transferring said personal computer commands to said personal computer terminate and stay resident application programs for execution.

6. A system according to claim 4 wherein said first subroutine is responsive to the depression of a predetermined key to call a selected terminate and stay resident program.

7. A system according to claim 6 wherein said first subroutine calls a selected function of said terminate and stay resident program.

8. A system according to claim 4 wherein said first subroutine is responsive to the depression of a plurality of predetermined keys to call a selected terminate and stray resident program.

9. A system according to claim 4 wherein said first subroutine is responsive to the depression of a plurality of keys to call a selected function of said terminate and stay resident program.

10. A system according to claim 5 including means responsive to said transferred personal computer command for identifying and calling the terminate and stay resident program for execution of said program.

11. A system according to claim 10 wherein said means responsive to said personal computer command identifies the terminate and stay resident program associated with said command and calls said identified program for execution of said command.

12. A system according to claim 11 wherein said means responsive to said personal computer command generates a vector identified with the function of said personal computer command.

13. A system according to claim 1 wherein said host computer screen data conversion means includes a routine for identification of personal computer commands.

14. A system according to claim 2 wherein said subroutine for conversion for host computer data identifies personal computer commands.

15. A system according to claim 14 including means responsive to personal computer commands contained in said host computer data for identifying and calling a terminate and stay resident program for execution of said identified command.

16. A system according to claim 15 wherein said means for identifying and calling a terminate and stay resident program generates a vector identified with the function of said personal computer command.

* * * * *